United States Patent
Spencer (10) Patent No.: US 10,759,261 B2
(45) Date of Patent: Sep. 1, 2020

(54) TRUCK CARGO BOX TONNEAU COVER SYSTEM INCLUDING A SIDE-LOCKING LOCK BAR LOCKING MULTIPLE SLATS

(71) Applicant: TruXedo, Inc., Yankton, SD (US)

(72) Inventor: Michael R. Spencer, Hubbard, NE (US)

(73) Assignee: TRUXEDO, INC., Yankton, SD (US)

( * ) Notice: Subject to any disclaimer, the term of this patent is extended or adjusted under 35 U.S.C. 154(b) by 75 days.

(21) Appl. No.: 16/213,100

(22) Filed: Dec. 7, 2018

(65) Prior Publication Data

US 2020/0180415 A1    Jun. 11, 2020

(51) Int. Cl.
| | | |
|---|---|---|
| *B60J 7/19* | (2006.01) | |
| *B60J 7/14* | (2006.01) | |
| *B60P 7/02* | (2006.01) | |

(52) U.S. Cl.
CPC .............. *B60J 7/198* (2013.01); *B60J 7/141* (2013.01); *B60P 7/02* (2013.01)

(58) Field of Classification Search
CPC ..... B60J 7/085; B60J 7/10; B60J 7/102; B60J 7/104; B60J 7/106; B60J 7/14; B60J 7/141; B60J 7/1607; B60J 7/198; B60P 7/02
USPC ............ 296/100.02, 100.06, 100.07, 100.16
See application file for complete search history.

(56) References Cited

U.S. PATENT DOCUMENTS

| | | |
|---|---|---|
| 5,040,843 A | 8/1991 | Russell et al. |
| 5,350,213 A | 9/1994 | Bernardo |
| 7,537,264 B2 | 5/2009 | Maimin et al. |
| 7,823,957 B2 | 11/2010 | Williamson et al. |
| 8,544,934 B2 * | 10/2013 | Maimin ................. B60J 7/1856 296/100.12 |
| 8,857,887 B1 | 10/2014 | Schmeichel |
| 8,939,494 B2 | 1/2015 | Maimin et al. |
| 9,211,833 B2 | 12/2015 | Rusher et al. |
| 10,406,899 B2 * | 9/2019 | Carter ....................... B60J 7/141 |
| 10,464,401 B2 * | 11/2019 | Facchinello ............ B60J 7/141 |
| 2010/0140973 A1 | 6/2010 | Duncan |
| 2011/0062744 A1 | 3/2011 | Schrader et al. |

* cited by examiner

*Primary Examiner* — Jason S Daniels
(74) *Attorney, Agent, or Firm* — William H. Honaker; Dickinson Wright PLLC (57) ABSTRACT

A lock bar can be laterally slidable between an unlocked position in which the lock bar is laterally recessed relative to the side rail and a locked position in which the lock bar is laterally extended relative to the side rail. The lock bar can be engageable with, and movable by, the tailgate to slide the lock bar from the unlocked position to the locked position as the tailgate moves from an open tailgate position to a closed tailgate position. Movement of the lock bar between the locked position and the unlocked position can simultaneously interengage and disengage, respectively, with each of the locking surfaces of the plurality of rectangular elements, which interengagement limits upward movement of the rectangular elements.

29 Claims, 9 Drawing Sheets

FIG. 13

TRUCK CARGO BOX TONNEAU COVER SYSTEM INCLUDING A SIDE-LOCKING LOCK BAR LOCKING MULTIPLE SLATS

FIELD

The present disclosure relates to truck cargo box tonneau cover systems including side locking or latching mechanisms.

BACKGROUND

This section provides background information related to the present disclosure which is not necessarily prior art.

Trucks such as pickups having an open top cargo box can be a quite popular type of vehicle because the cargo box enables objects of various sizes to be placed therein and transported. Tonneau cover systems can be used to cover the top of cargo box in a closed or extended configuration to protect the contents against dirt, debris, and other environmental contaminants, and to improve the aesthetic quality thereof.

In some cases, the tonneau covers can be formed of a plurality of rectangular elements in the form of slats that are hingedly coupled together so they can be rolled-up into a tubular compact, storage, open or retracted storage configuration at the front of the cargo box to allow access to the cargo box. In some cases, the tonneau covers can be formed of a plurality of rectangular elements in the form of sections that are hingedly coupled together so they can be folded-up into a stacked compact, storage, open or retracted storage configuration at the front of the cargo box.

Although a forward rectangular element or header and a rear rectangular element or header are typically coupled to the sides of the cargo box in the closed or extended configuration, additional protection against unauthorized access could potentially be provided by latching or locking the sides of the rectangular elements between the forward and rear headers to the side rails. One potential solution could involve providing movable latching components on each of the plurality of rectangular elements that engage the side rail. Disadvantages of such a solution can include significant additional parts, that increase assembly and manufacturing costs, and added complexity in locking and unlocking such a large number of latches.

Another potential solution could involve providing a single long movable latching component on each side rail that rotates between a locked position in which the latching component engages the rectangular elements and an unlocked position in which the latching component is rotated away from the rectangular elements. Disadvantages of such a solution can include the lack of a positive stop along the longitudinal length of the latching component to resist upward movement of the tonneau cover.

SUMMARY

This section provides a general summary of the disclosure, and is not a comprehensive disclosure of its full scope or all of its features.

In accordance with one aspect of the present disclosure, a tonneau cover system is provided for a truck cargo box including a forward end and a rear end tailgate, and left and right side walls extending therebetween. Such a tonneau cover system can include left and right side rails supportable along the left and right side walls, respectively, of the cargo box. A lock bar can be slidably supported by each side rail. Each lock bar can extend longitudinally along a length of the side rail and can be laterally slidable between an unlocked position in which the lock bar is laterally recessed relative to the side rail, and a locked position in which the lock bar is laterally extended relative to the side rail. Each lock bar can define a lock bar plane. A tonneau cover can include a plurality of rectangular elements supportable on the left and right side rails and being hingedly coupled together and moveable between an open cover position in which the rectangular elements are in a longitudinally retracted storage configuration to allow access to the cargo box, and a closed cover position in which the rectangular elements are in a longitudinally extended configuration to cover the cargo box, and in which the plurality of rectangular elements define a tonneau cover plane. Each of the rectangular elements can include a locking surface. The lock bar can be engageable with, and movable by, the tailgate to slide the lock bar from the unlocked position to the locked position as the tailgate moves from an open tailgate position to a closed tailgate position. Movement of the lock bar between the locked position and the unlocked position can simultaneously interengage and disengage, respectively, with each of the locking surfaces of the plurality of rectangular elements. This interengagement can limit upward movement of the rectangular elements. In both the locked and unlocked positions of the lock bar, the lock bar plane can be substantially parallel to the tonneau cover plane.

In accordance with another aspect of the present disclosure, a tonneau cover system is provided for a truck cargo box including a forward end and a rear end tailgate, and left and right side walls extending therebetween. Such a tonneau cover system can include left and right side rails supportable along the left and right side walls, respectively, of the cargo box. Each side rail can include a lower inner longitudinal surface and a upper outer longitudinal surface along a length of the side rail. A lock bar can be slidably supportable by each side rail with each lock bar having a corresponding lock bar length extending longitudinally along the length of the side rail. The lock bar can be laterally slidable between an unlocked position in which the lock bar is laterally recessed relative to the side rail, and a locked position in which the lock bar is laterally extended relative to the side rail. Each lock bar can include an upper inner longitudinal margin and a lower outer longitudinal margin along the corresponding lock bar length. A tonneau cover can include a plurality of rectangular elements supportable on the left and right side rails. The plurality of rectangular elements can be hingedly coupled together and moveable between an open cover position in which the rectangular elements are in a longitudinally retracted storage configuration to allow access to the cargo box, and a closed cover position in which the rectangular elements are in a longitudinally extended configuration to cover the cargo box and in which the plurality of rectangular elements extend along the length of the side rail and the corresponding lock bar length. Each of the rectangular elements can include a locking surface. The lock bar can be engageable with, and movable by, the tailgate to slide the lock bar from the unlocked position to the locked position as the tailgate moves from an open tailgate position to a closed tailgate position. Movement of the lock bar between the locked position and the unlocked position simultaneously interengages and disengages, respectively, with each of the locking surfaces of the plurality of rectangular elements. This interengagement can limit upward movement of the plurality of rectangular elements. When the tonneau cover is in the closed cover position and the lock bar is in the locked position, upward movement of any of the plurality of rectangular elements and rotation of the lock bar about a longitudinal lock bar axis is limited by engagement of the upper inner longitudinal margin of the lock bar against the lower inner longitudinal surface of the side rail and engagement of the lower outer longitudinal margin of the lock bar against the upper outer longitudinal surface of the side rail.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-10 illustrate one exemplary tonneau cover system 20 for a truck cargo box 22 in accordance with the present disclosure. The truck cargo box 22 typically includes a forward end 24 and a rear end 26, and left and right side walls 28, extending between the forward and rear ends, 24 and 26, respectively. The forward end 24 can include a front wall 30 and the rear end 26 can include a tailgate 32. The tonneau cover system 20 can generally include side rails 34 slidably supporting lock bars 36, and a tonneau cover 38 including a plurality of rectangular elements 40 hingedly coupled together.

The tonneau cover system 20 can include left and right side rails 34 that are supportable along the left and right side walls 28, respectively. A lock bar 36 can be slidably supported by each side rail 34. Each lock bar 36 can extend longitudinally along a length of the side rail 34 supporting it. Each lock bar 36 can be slidable relative to the side rail 34 between an unlocked position (e.g., FIGS. 9 and 10) in which the lock bar 36 is laterally recessed relative to the side rail 30 and a locked position (e.g., FIGS. 7 and 8) in which the lock bar 36 is laterally extended relative to the side rail 30.

Each lock bar 36 can define a lock bar plane. Each lock bar 36 can have a rectangular lateral or transverse cross-section (e.g., FIGS. 8 and 10), and an upper surface 44 of the lock bar 36 can define the lock bar plane. Each lock bar 36 can be mounted in a channel 46 of the respective side rail 34, and can be slidable in the channel 46 laterally outwardly so the lock bar 36 becomes more recessed relative to the channel 46 and the respective side rail 34 and side wall 28, and can be slidable in the channel 46 laterally inwardly so the lock bar 36 becomes more extended relative to the channel 46 and respective side rail 34 and side wall 28. Thus, laterally inwardly or inner, and laterally outwardly or outer, in this context corresponds to movement or position toward and away from, respectively, the longitudinal center line of the truck 21, cargo box 22, and tonneau cover 38.

Each side rail 34 can include a lower inner longitudinal or longitudinally extending surface 48 and a upper outer longitudinal or longitudinally extending surface 50 along a longitudinal length of the side rail 34. Each lock bar 36 can include an upper inner longitudinal or longitudinally extending margin 52 and a lower outer longitudinal or longitudinally extending margin 54 along the corresponding longitudinal lock bar length. The upper inner margin 52 can be on the upper surface 44 of the lock bar 36, and the lower outer margin 54 can be on the lower surface of the lock bar 36 opposite the upper surface 44. As examples, the longitudinal length of the side rail 34 and the corresponding lock bar length can both be defined by the overall longitudinal length of the lock bar 36, or can be defined by the overall length of the side rail 34, or a length less than the overall length of the side rail 34 or of the lock bar 36. The overall length of the lock bar 36, however, is typically less than the overall length of the side rail 34 to avoid the tonneau cover 38 on the side rails 34 in the open position and the lock bar 36 interfering with each other.

The tonneau cover system 20 can include a tonneau cover 38 with a plurality of rectangular elements 40 supportable on the left and right side rails 28. The rectangular elements 40 can be pivotably or hingedly coupled together so they are moveable between an open cover position (FIG. 3) in which the rectangular elements 40 are in a longitudinally retracted storage configuration to allow access to the cargo box 22, and a closed cover position (FIG. 1) in which the rectangular elements 40 are in a longitudinally extended configuration to cover the cargo box 22. In the closed cover position, the plurality of rectangular elements 40 can define a tonneau cover plane. For example, the upper surfaces of the rectangular elements 40 or of the cover material 62 in the closed cover position can define the tonneau cover plane.

As in the illustrated embodiment, the tonneau cover 38 can be a roll-up tonneau cover in which the rectangular elements are slats 40 and the tonneau cover 38 can be rolled up upon and can extend above the side rails 34 in the open cover position. The tonneau cover 38 can, e.g., alternatively be a fold-up tonneau cover in which the rectangular elements 40 are panels that can be folded together upon and can extend above the side rails 34 in the open cover position.

The rectangular elements 40 of the tonneau cover 38 can be pivotably or hingedly coupled together via hinge members 56. As in the illustrated embodiment, each hinge member 56 can include intermediate components 57 separate from the rectangular elements 40. The intermediate component 57 can be elastomeric or flexible and can include coupling projections 58 extending along opposite sides. The coupling projections 58 can be captured in cooperating coupling channels 60 extending along opposing sides of the adjacent rectangular elements 40. In other embodiments, the hinge members 56 can include integral cooperating coupling channels or elements that directly hingedly couple with each other. These integral coupling elements can, for example, be extruded together with frame members or the main body 68 of the rectangular elements 40 and can extend along opposite sides of adjacent rectangular elements 40 that directly couple with each other.

The tonneau cover 38 can include a cover material 62 extending continuously over the plurality of rectangular slats 40, for example, to help prevent moisture from penetrating the tonneau cover 38 and leaking into the cargo box 22. The tonneau cover 38 can also include a seal member 63 extending along the lateral sides of the tonneau cover 38 to help prevent moisture from penetrating between the tonneau cover 38 and the side rails 34 and into the cargo box 22.

Each of the rectangular elements 40 can include a locking surface 42. As in this illustrated embodiment, each rectangular element 40 can include a main body 68 and an end cap 64, and the end cap 64 of each slat 40 can form the locking surface 42. For example, a recess 66 of the end cap 64 can form the locking surface 42. In other embodiments, the locking surface 42 can be provided by another portion of the end cap 64, such as an upper surface thereof, or by the main body 68, or by another component (not shown) that is coupled to the main body 68 of the rectangular element 40. As used herein, each of the plurality of rectangular elements 40 can be all of the plurality of rectangular elements 40 that make up the tonneau cover 38, or some subset thereof. For example, each of the rectangular elements can be a subset of rectangular elements that are coupled in immediate succession with each other, or a subset of rectangular elements coupled together with intervening rectangular elements of the tonneau cover therebetween (e.g., alternating rectangular elements 40 of the tonneau cover 38), or any combination of the above subsets.

The lock bar 36 can include a lock bar main body 102 and a separate actuator component 72 coupled to the main body 102 of the lock bar 36. For example, the actuator component 72 can be a simple bumper or extension that is rigidly coupled to a rear end of the main body 102 and positioned to engage the tailgate as the tailgate moves from an open position to a closed position. Alternatively, the actuator component 72 can be movably coupled to the lock bar main body 102. In the retracted or unlocked position, the lock bar 36 can extend a first distance rearward of the rear end 104 of the side rail 34. In the extended or locked position, the lock bar 36 can extend a second distance rearward of the rear end 104 of the side rail 34 that is less than the first distance.

Each lock bar 36 can have a rear end 74 that is engageable with, and movable by, the tailgate 32 as the tailgate 32 moves from the open tailgate position to the closed tailgate position. As the tailgate 32 moves to the closed tailgate position, the tailgate 32 engages and moves the actuator component 72 of the rear end 74 of the lock bar 36 to engage and slide the lock bar 36 from the retracted or unlocked position to the extended or locked position. Movement of the lock bar 36 between the locked position and the unlocked position can simultaneously interengage and disengage, respectively, the lock bar 36 with the locking surfaces 42 of each of the plurality of rectangular elements 40 of the tonneau cover 38. This interengagement limits upward movement of the rectangular elements 40.

When the tonneau cover 38 is in the closed cover position (FIG. 1) and the lock bar 36 is in the locked position (e.g., FIGS. 7 and 8), upward movement of any one of the plurality of rectangular elements 40 and rotation of the lock bar 36 about its longitudinal axis can both be limited by engagement of the upper inner longitudinal margin 52 of the lock bar 36 against the lower inner longitudinal surface 48 of the side rail 34 and engagement of the lower outer longitudinal margin 54 of the lock bar 36 against the upper outer longitudinal surface 50 of the side rail to 34. In both the locked and unlocked positions of the lock bar, the lock bar plane can be substantially parallel to the tonneau cover plane (in the extended or closed cover position). A slight gap can be provided, e.g., between the upper inner longitudinal margin 52 of the lock bar 36 and the lower inner longitudinal surface 48 of the side rail 34, to account for manufacturing tolerances, or to facilitate sliding action, or both.

This engagement of the upper inner longitudinal margin 52 of the lock bar 36 against the lower inner longitudinal surface 48 of the side rail 34, or of the lower outer longitudinal margin 54 of the lock bar 36 against the upper outer longitudinal surface 50 of the side rail to 34, or of both, can occur simultaneously along the length of the side rail 34 and the corresponding lock bar length. Separately, the engagement of the upper inner longitudinal margin 52 of the lock bar 36 against the lower inner longitudinal surface 48 of the side rail 34, or of the lower outer longitudinal margin 54 of the lock bar 36 against the upper outer longitudinal surface 50 of the side rail to 34, or of both, can occur continuously along the length of the side rail 34 and the corresponding lock bar length. The corresponding lock bar length can be the overall length of the lock bar 36, or a portion thereof.

The tonneau cover 38 can include a front header 88 and a rear header 90. The front header 88 and the rear header 90 can be coupled to the plurality of rectangular elements 40 at the forward end and a rearward end, respectively, of the tonneau cover 38. The front header 88 can be coupled to the side rails 34, side walls 28, or both, in both the open and closed cover positions. A slam latch 92 can be coupled to each lateral side of the rear header 90 of the tonneau cover 38 to selectively latch the rear header 90 to the side rails 34. An actuator 94, such as the illustrated cable, can extend between the slam latches 92 and can enable operation of both slam latches 92 via a single action, such as pulling on the actuator cable 94. Such slam latches 92, for example, can sufficiently couple the rear header 90 to the side rails 34 to permit the truck 21 to be driven with the tonneau cover 38 in the closed position and the tailgate 32 down or open.

Each lock bar 36 can include a plurality of angled recesses or slots 96 and each side rail 34 can include a plurality of pins 98. For example, the pins can be mounted in recesses or apertures 97 in the side rail 34 engaging the angled slots 96 to guide the lock bar 36 between its locked and unlocked positions. The slots 96 can be angled so that longitudinal movement of the lock bar 36 in a forward direction or toward the forward end 24 of the cargo box 22 and of the tonneau cover 38 moves the lock bar 36 laterally inwardly relative to the side rail 34 and toward the unlocked position. Similarly, the slots 96 can be angled so that longitudinal movement of the lock bar 36 in a rearward direction or toward the rear end 26 of the cargo box 22 and the tonneau cover 38 moves the lock bar 36 laterally outward relative to the side rail 34 and toward the locked position.

A lock bar biasing member 100 can bias the rear end 78 of the lock bar 36 longitudinally in a rearward direction or toward the rear end 24 of the cargo box 22 and of the tonneau cover 38 and toward the recessed or unlocked position of the lock bar 36. Such a lock bar biasing member 100 can also bias the rear end 74 of the lock bar 36 toward the tailgate 32.

In an alternative embodiment, the actuator component 72 can be movable along the longitudinal axis of the lock bar 36 relative to the lock bar main body 102. An actuator biasing member (not shown) between the lock bar main body 102 and the actuator component 72 can bias these components 102, 72 away from each other along the longitudinal axis of the lock bar 36. This actuator biasing member can exert a biasing force that is greater than the biasing force of the lock bar biasing member 100. Thus, the actuator component 72 can move without moving the lock bar main body 102 in cases where the tailgate 32 is closed, for example, while the tonneau cover 38 is in an intermediate position, which might otherwise damage the tonneau cover 38 or locking system. As examples, the biasing member can include a spring or an elastic compound.

A pin (not shown) can be provided at a distal end of a spring arm (not shown) extending rearwardly from the lock bar main body 102. As the rear end of the lock bar main body 102 enters the channel 46 of the side rail 34, the side rail 34 can push the spring arm down, causing the pin to engage a cooperating recess (not shown) in the actuator component 72 and prevent further longitudinal movement of the components relative to each other. Thus, an intruder would not be able to move the lock bar main body 102 of the lock bar 36 from its locked position without opening the tailgate 32.

Figure 1:
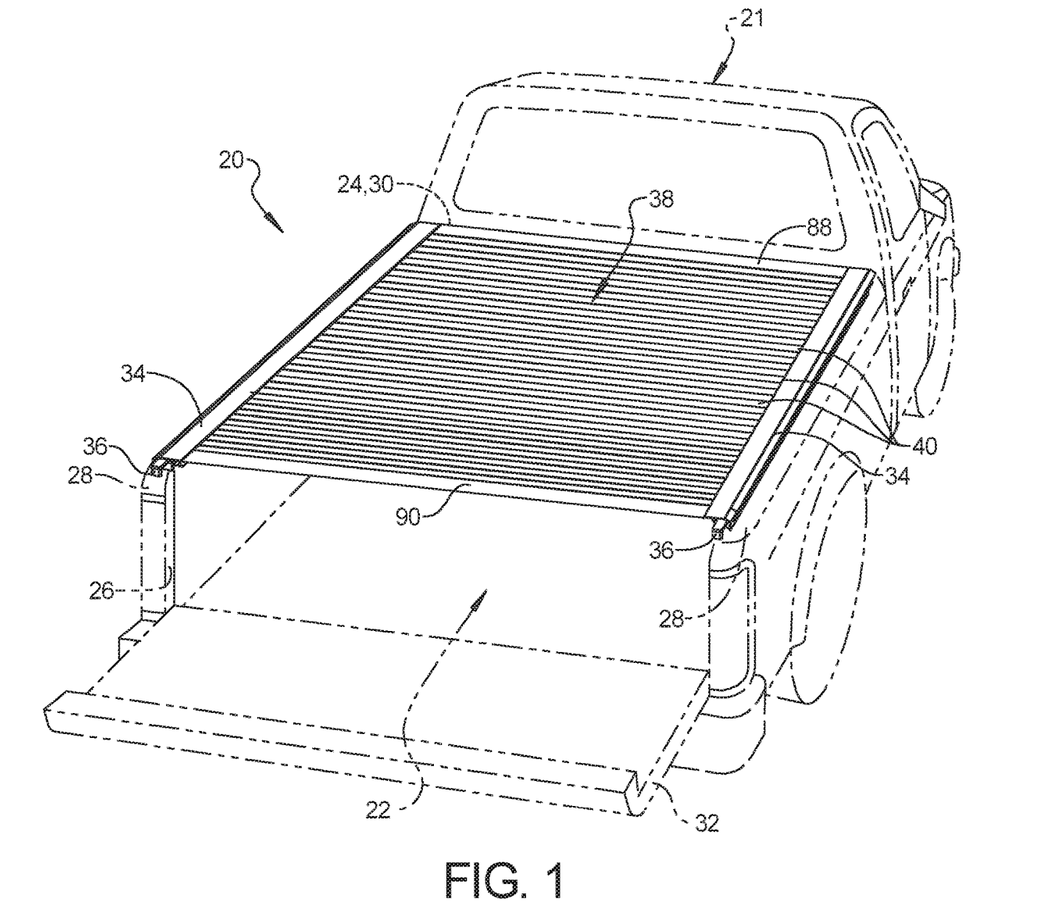
FIG. 1 is a perspective view of one exemplary truck cargo box tonneau cover system in accordance with the present disclosure with the tonneau cover in a longitudinally extended or closed cover position.
Figure 2:
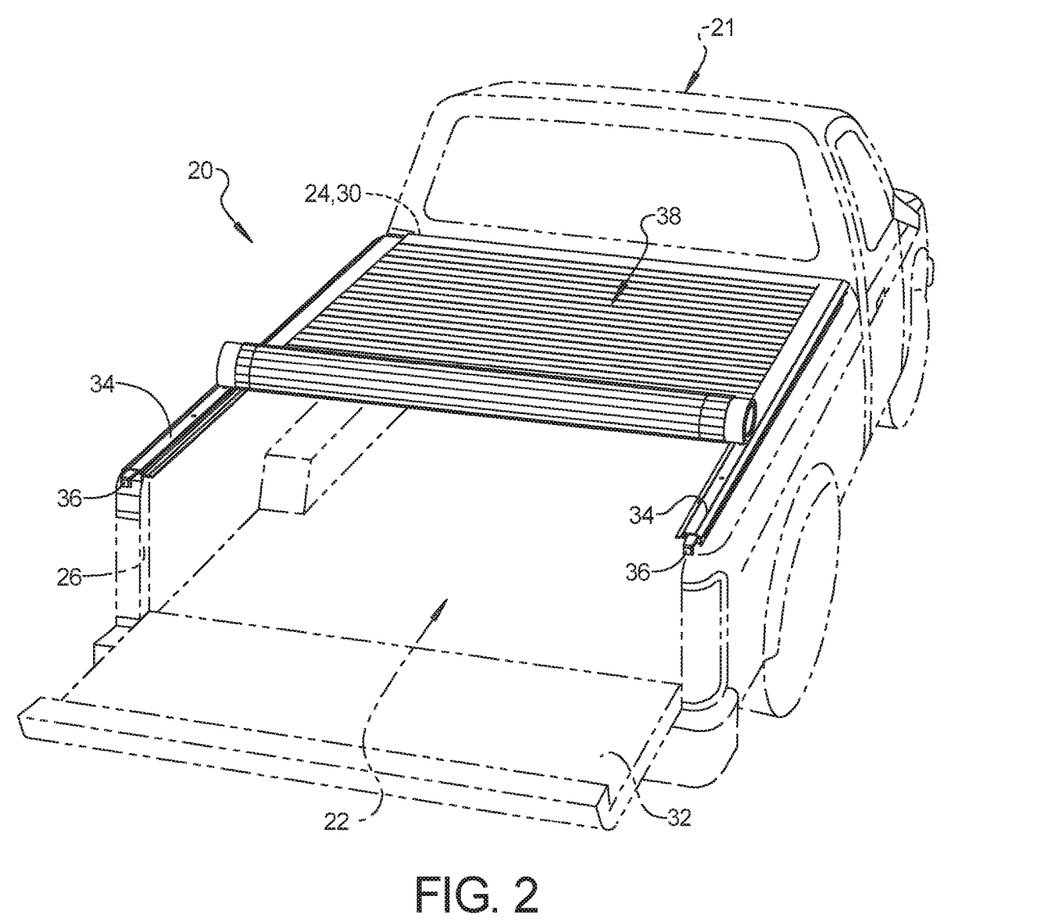
FIG. 2 is a perspective view of the truck cargo box tonneau cover system of FIG. 1 with the tonneau cover in an intermediate position.
Figure 3:
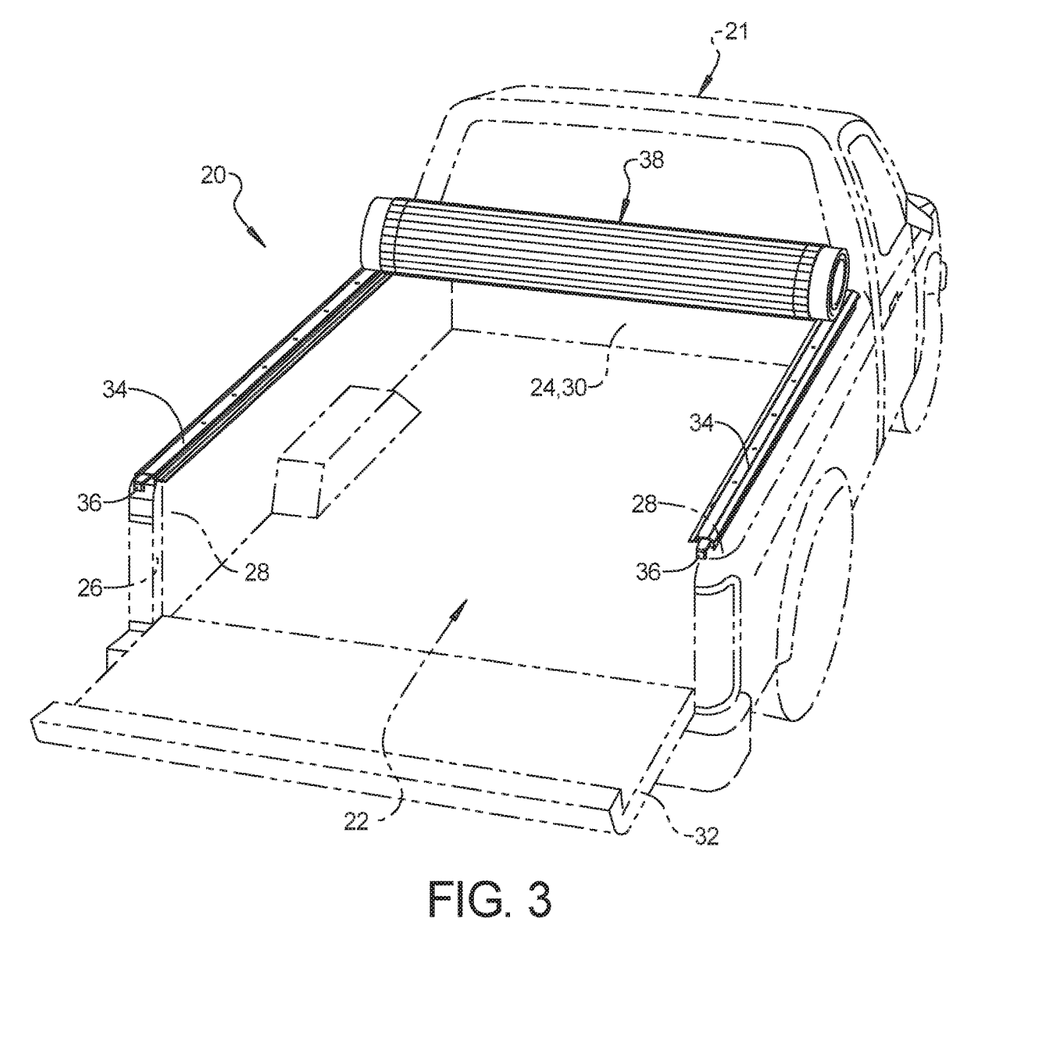
FIG. 3 is a perspective view of the truck cargo box tonneau cover system of FIG. 1 with the tonneau cover in a longitudinally retracted or open cover position.
Figure 4:
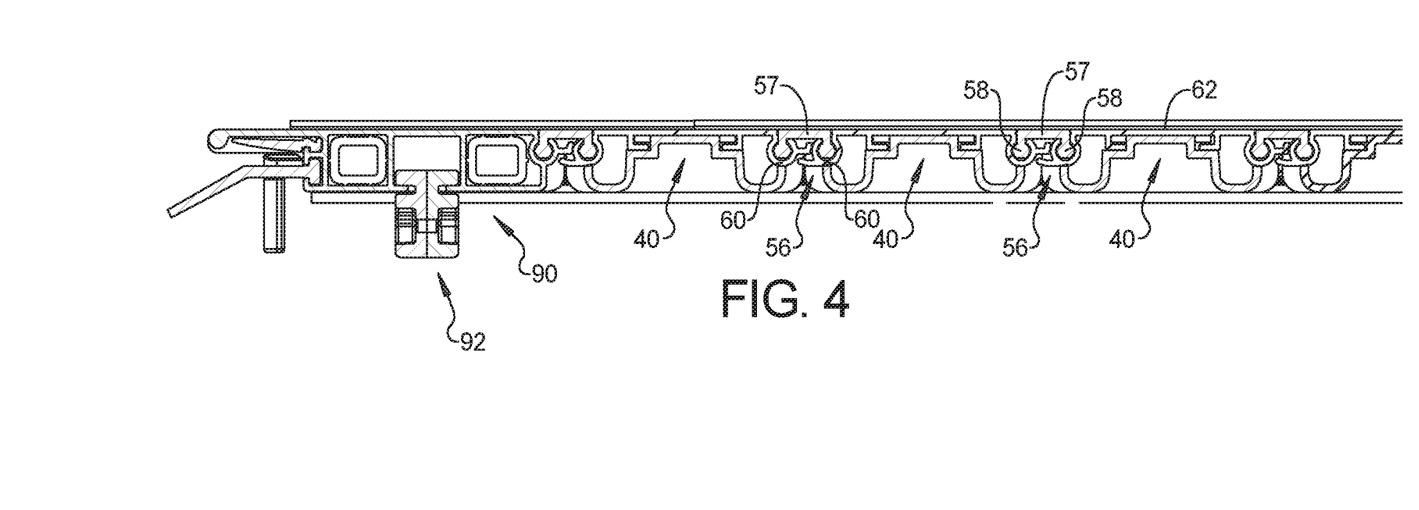
FIG. 4 is a partial longitudinal cross-section of certain components of the tonneau cover system of FIG. 1.
Figure 5:
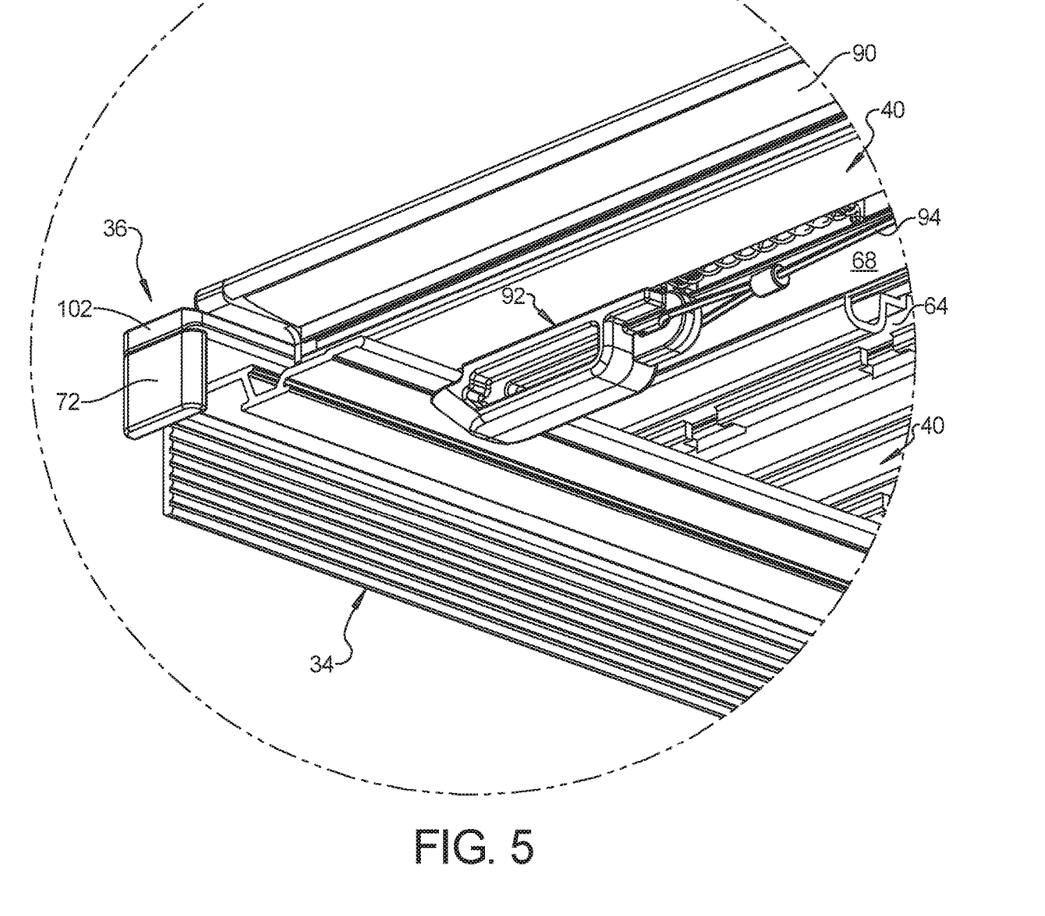
FIG. 5 is a partial perspective view of the tonneau cover system of FIG. 1.
Figure 6:
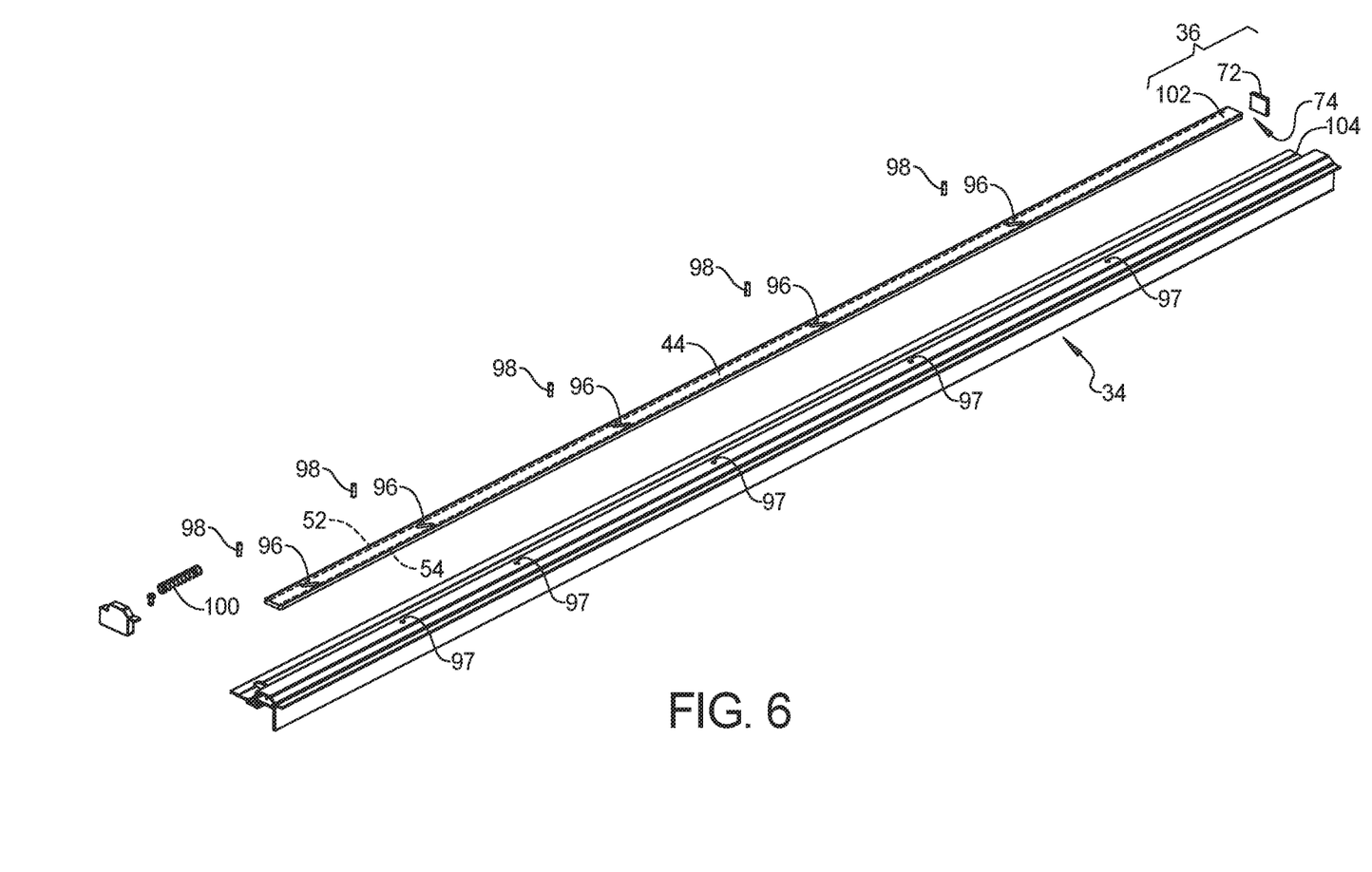
FIG. 6 is an exploded view of certain components of the tonneau cover system of FIG. 1.
Figure 7:
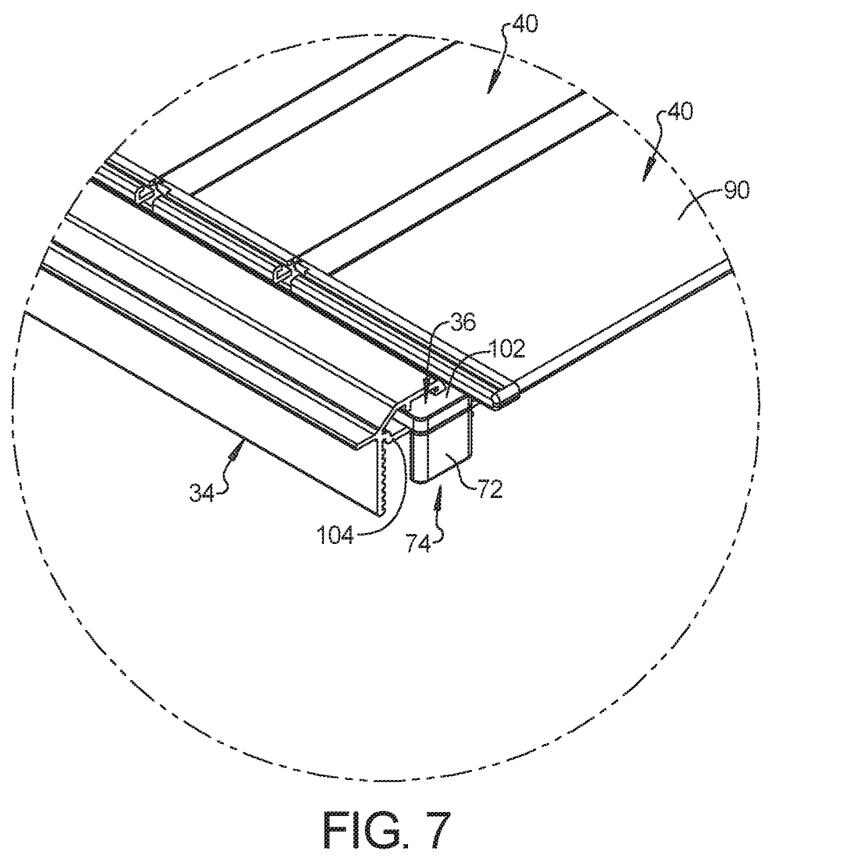
FIG. 7 is a partial perspective view of the tonneau cover system of FIG. 1 with the tonneau cover in its longitudinally extended or closed cover position, and the lock bar in its laterally extended or locked position and the lock bar correspondingly extending a first distance past the rear end of the side rail.
Figure 8:
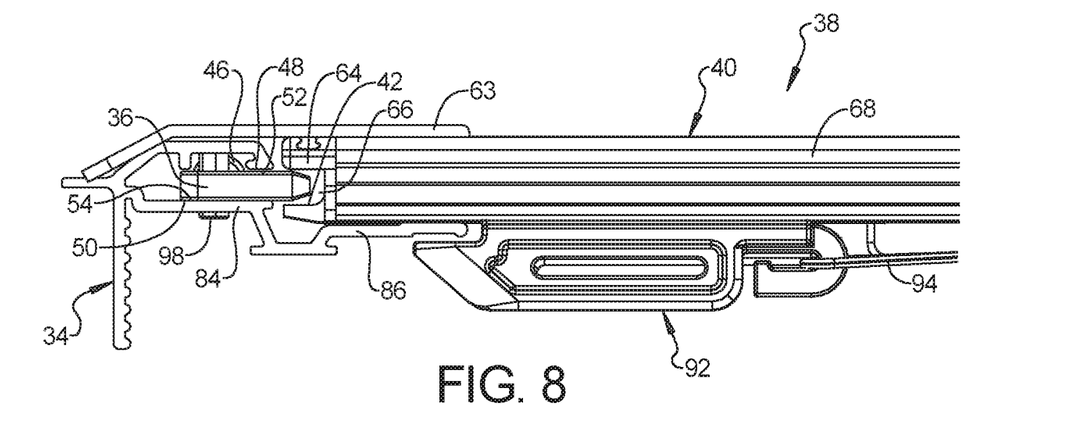
FIG. 8 is a rear plan view of the tonneau cover system of FIG. 1 with the tonneau cover in its longitudinally extended or closed cover position, and the lock bar (minus the actuator component) in its laterally extended or locked position.
Figure 9:
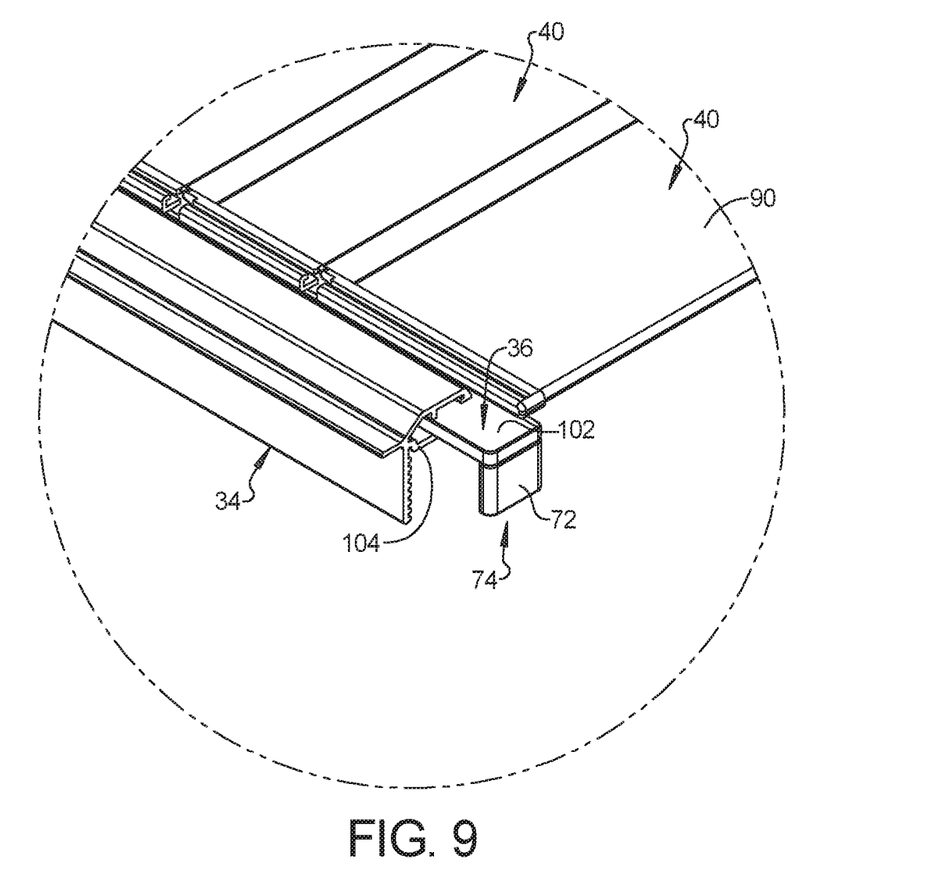
FIG. 9 is a partial perspective view similar to FIG. 7, but with the lock bar in its laterally retracted or unlocked position and the lock bar correspondingly extending a second distance past the rear end of the side rail that is greater than the first distance.
Figure 10:
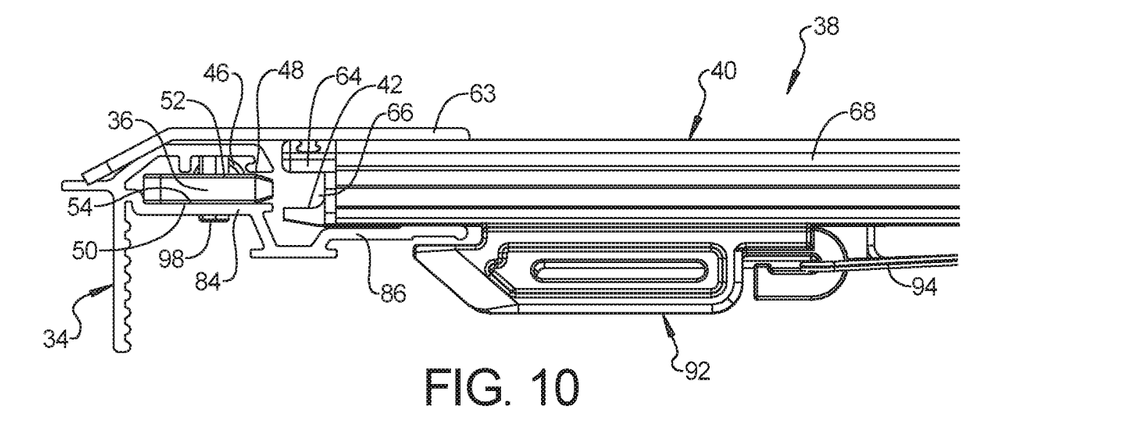
FIG. 10 is a partial perspective view similar to FIG. 8 with the tonneau cover in its longitudinally extended or closed cover position, but with the lock bar (minus the actuator component) in its laterally retracted or unlocked position.
Figure 11:
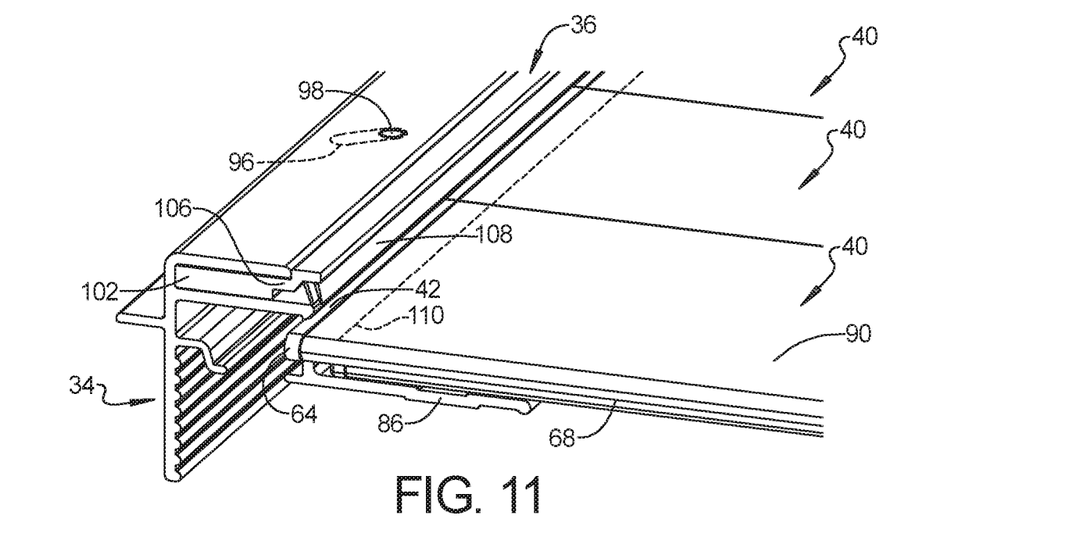
FIG. 11 is a simplified partial perspective view of another exemplary truck cargo box tonneau cover system in accordance with the present disclosure.
Figure 12:
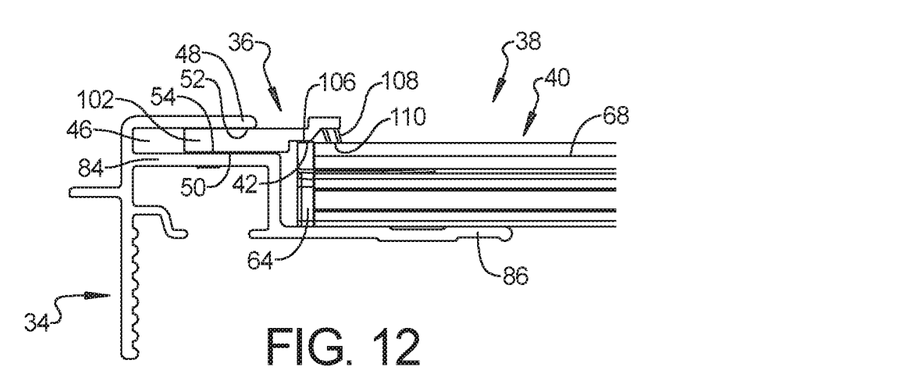
FIG. 12 is a partial rear plan view of the tonneau cover system of FIG. 11 with the tonneau cover in its longitudinally extended or closed cover position, and the lock bar (minus its actuator component) in its laterally extended or locked position.
Figure 13:
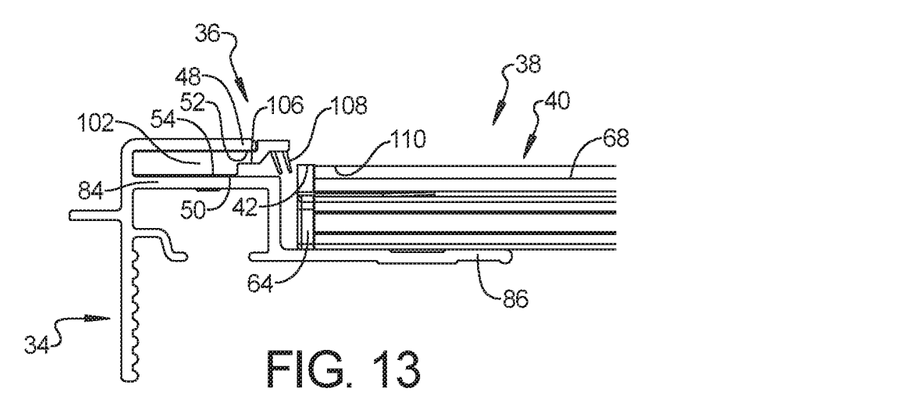
FIG. 13 is a partial perspective view similar to FIG. 12 with the tonneau cover in its longitudinally extended or closed cover position, but with the lock bar (minus the actuator component) in its laterally retracted or unlocked position.

FIGS. 11-13 illustrate another exemplary tonneau cover system 20 for a truck cargo box 22 in accordance with the present disclosure. To avoid unnecessary duplication, some common features are not illustrated and repeated below. Instead, the discussion below about this embodiment focuses primarily on differences between this embodiment and the other embodiments and alternatives hereof. Accordingly, the same reference numerals are used for all embodiments to indicate like elements, even if the elements are not identical, and the entirety of the discussion of the other embodiments and alternatives herein, is likewise applicable to this embodiment unless it is irreconcilable with the description of this embodiment below.

Similar to the prior embodiments, each lock bar 36 can be supported in a channel 46 of the side rail 34. Pins 98 of the side rails 34 can extend into angled recesses or slots 96 of the lock bar 36 to guide the lock bar 36 between the locked position (FIG. 12) and the unlocked position (FIGS. 11 and 13).

The rectangular elements 40 can include a locking surface 42. The locking surface 42 can be an upper locking surface of the end caps 64 of the rectangular elements 40. Each lock bar 36 can include a lower inner longitudinally extending cooperating locking surface 106 that engages the locking surfaces 42 of the rectangular elements 40 in the locked position.

The lock bar 36 can include one or more longitudinally extending sealing members 108 that can engage upper sealing surfaces 110 of the rectangular elements 40. As in this example, the upper sealing surfaces 110 can be provided by the main body 68 of the rectangular elements 40. As other examples, the sealing surfaces 110 can be provided by a continuously extending cover material 62, or by the end caps 64.

U.S. patent application Ser. No. 15/642,593, filed on Jul. 6, 2017, entitled "Tonneau Cover System with Intermediate Automatic Latching," and naming Chad Carter, et al. as inventors; and U.S. patent application Ser. No. 16/213,058, filed on Dec. 7, 2018, entitled "Truck Cargo Box Tonneau Cover System Including a Side-Locking Lock Bar Locking Multiple Slats," and naming Michael Spencer as inventor; are both incorporated herein by reference in their entirety.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Similarly, the features, or combinations of features, or alternatives thereto, of one embodiment can be combined with features or combinations of features, or alternatives thereto, of other embodiments. In some example embodiments, well-known processes, well-known device structures, and well-known technologies are not described in detail.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a truck cargo box including a forward end and a rear end tailgate, and left and right side walls extending therebetween, the tonneau cover system comprising:
left and right side rails supportable along the left and right side walls, respectively,
a lock bar slidably supported by each side rail, each lock bar extending longitudinally along a length of the side rail and being laterally slidable between an unlocked position in which the lock bar is laterally recessed relative to the side rail and a locked position in which the lock bar is laterally extended relative to the side rail, and each lock bar defining a lock bar plane;
a tonneau cover including a plurality of rectangular elements supportable on the left and right side rails and being hingedly coupled together and moveable between an open cover position in which the rectangular elements are in a longitudinally retracted storage configuration to allow access to the cargo box, and a closed cover position in which the rectangular elements are in a longitudinally extended configuration to cover the cargo box and in which the plurality of rectangular elements define a tonneau cover plane, and each of the rectangular elements including a locking surface;
wherein the lock bar is engageable with, and movable by, the tailgate to slide the lock bar from the unlocked position to the locked position as the tailgate moves from an open tailgate position to a closed tailgate position;
wherein movement of the lock bar between the locked position and the unlocked position simultaneously interengages and disengages, respectively, with each of the locking surfaces of the plurality of rectangular elements, which interengagement limits upward movement of the plurality of rectangular elements; and
wherein the lock bar plane and the tonneau cover plane are substantially parallel to each other in both the locked and unlocked positions.

2. The tonneau cover system of claim 1, wherein the lock bar comprises a main body component coupled to a separate actuator component that directly engages against the tail gate.

3. The tonneau cover system of claim 1, wherein each of the plurality of rectangular elements includes an end cap that provides the locking surface.

4. The tonneau cover system of claim 1, wherein each of the plurality of rectangular elements includes an end cap having a recess that forms the locking surface.

5. The tonneau cover system of claim 1, wherein an upper surface of the each of the plurality of the rectangular elements provides the locking surface.

6. The tonneau cover system of claim 1, wherein the plurality of rectangular elements are slats and the tonneau cover is a roll-up tonneau cover in which the tonneau cover is rolled-up upon the side rails in the open cover position.

7. The tonneau cover system of claim 1, wherein one of the plurality of rectangular elements that is interengaged by the lock bar is a rear header, and a slam latch is coupled to the rear header of the tonneau cover to selectively latch the rear header to one of the side rails.

8. The tonneau cover system of claim 1, wherein a biasing member biases each lock bar toward the recessed position.

9. The tonneau cover system of claim 8, wherein the biasing member biases each lock bar toward a corresponding rear end of the tonneau cover.

10. The tonneau cover system of claim 1, wherein a biasing member biases each lock bar toward a corresponding rear end of the tonneau cover, and the lock bar slides forwardly and laterally inwardly as the lock bar moves from the unlocked to the locked position.

11. The tonneau cover system of claim 1, wherein each lock bar includes a plurality of angled slots and each side rail includes pins engaging the angled slots to guide the lock bar between its locked and unlocked positions.

12. The tonneau cover system of claim 1, wherein each lock bar comprises a sealing member that seals against the top of the tonneau cover.

13. The tonneau cover system of claim 1, wherein each side rail includes a lower inner longitudinal surface and an upper outer longitudinal surface along a length of the side rail and each lock bar includes an upper inner longitudinal margin and a lower outer longitudinal margin along the corresponding lock bar length, and wherein when the tonneau cover is in the closed cover position and the lock bar is in the locked position, upward movement of any of the plurality of rectangular elements and rotation of the lock bar about a longitudinal lock bar axis is limited by engagement of the upper inner longitudinal margin of the lock bar against the lower inner longitudinal surface of the side rail and engagement of the lower outer longitudinal margin of the lock bar against the upper outer longitudinal surface of the side rail.

14. A tonneau cover system for a truck cargo box including a forward end and a rear end tailgate, and left and right side walls extending therebetween, the tonneau cover system comprising:
left and right side rails supportable along the left and right side walls, respectively, and each side rail including a lower inner longitudinal surface and a upper outer longitudinal surface along a length of the side rail;
a lock bar slidably supportable by each side rail with each lock bar having a corresponding lock bar length extending longitudinally along the length of the side rail and being laterally slidable between an unlocked position in which the lock bar is laterally recessed relative to the side rail, and a locked position in which the lock bar is laterally extended relative to the side rail, and each lock bar including an upper inner longitudinal margin and a lower outer longitudinal margin along the corresponding lock bar length;
a tonneau cover including a plurality of rectangular elements supportable on the left and right side rails and being hingedly coupled together and moveable between an open cover position in which the rectangular elements are in a longitudinally retracted storage configuration to allow access to the cargo box and a closed cover position in which the rectangular elements are in a longitudinally extended configuration to cover the cargo box, and in which the plurality of rectangular elements extend along the length of the side rail and the corresponding lock bar length, and each of the rectangular elements including a locking surface;
wherein the lock bar is engageable with, and movable by, the tailgate to slide the lock bar from the unlocked position to the locked position as the tailgate moves from an open tailgate position to a closed tailgate position;
wherein movement of the lock bar between the locked position and the unlocked position simultaneously interengages and disengages, respectively, with each of the locking surfaces of the plurality of rectangular elements, which interengagement limits upward movement of the plurality of rectangular elements; and wherein when the tonneau cover is in the closed cover position and the lock bar is in the locked position, upward movement of any of the plurality of rectangular elements and rotation of the lock bar about a longitudinal lock bar axis is limited by engagement of the upper inner longitudinal margin of the lock bar against the lower inner longitudinal surface of the side rail and engagement of the lower outer longitudinal margin of the lock bar against the upper outer longitudinal surface of the side rail.

15. The tonneau cover system of claim 14, wherein the engagement of the upper inner longitudinal margin of the lock bar against the lower inner longitudinal surface of the side rail occurs simultaneously along the length of the side rail and the corresponding lock bar length.

16. The tonneau cover system of claim 14, wherein the engagement of the upper inner longitudinal margin of the lock bar against the lower inner longitudinal surface of the side rail occurs continuously along the length of the side rail and the corresponding lock bar length.

17. The tonneau cover system of claim 14, wherein the length of the side rail and the corresponding lock bar length is an overall length of the lock bar.

18. The tonneau cover system of claim 14, wherein the lock bar comprises a main body component coupled to a separate actuator component that directly engages against the tail gate.

19. The tonneau cover system of claim 14, wherein each of the plurality of rectangular elements includes an end cap that provides the locking surface.

20. The tonneau cover system of claim 14, wherein each of the plurality of rectangular elements includes an end cap having a recess that forms the locking surface.

21. The tonneau cover system of claim 14, wherein an upper surface of the each of the plurality of the rectangular elements provides the locking surface.

22. The tonneau cover system of claim 14, wherein the plurality of rectangular elements are slats and the tonneau cover is a roll-up tonneau cover in which the tonneau cover is rolled-up upon the side rails in the open cover position.

23. The tonneau cover system of claim 14, wherein each of the plurality of rectangular elements includes an end cap having a recess that forms the locking surface.

24. The tonneau cover system of claim 14, wherein a biasing member biases each lock bar toward the recessed position.

25. The tonneau cover system of claim 24, wherein the biasing member biases each lock bar toward a corresponding rear end of the tonneau cover.

26. The tonneau cover system of claim 14, wherein a biasing member biases each lock bar toward a corresponding rear end of the tonneau cover, and the lock bar slides forwardly and laterally inwardly as the lock bar moves from the unlocked to the locked position.

27. The tonneau cover system of claim 14, wherein each lock bar includes a plurality of angled slots and each side rail includes pins engaging the angled slots to guide the lock bar between its locked and unlocked positions.

28. The tonneau cover system of claim 14, wherein each lock bar comprises a sealing member that seals against the top of the tonneau cover.

29. The tonneau cover system of claim 14, wherein one of the plurality of rectangular elements that is interengaged by the lock bar is a rear header, and a slam latch is coupled to the rear header of the tonneau cover to selectively latch the rear header to one of the side rails.

\* \* \* \* \*